(12) United States Patent
Barrett

(10) Patent No.: US 6,928,592 B2
(45) Date of Patent: Aug. 9, 2005

(54) COMMUNICATION CHANNEL ACCURACY MEASUREMENT

(75) Inventor: Paul Barrett, Ipswich (GB)

(73) Assignee: Psytechnics Limited, Ipswich (GB)

( * ) Notice: Subject to any disclaimer, the term of this patent is extended or adjusted under 35 U.S.C. 154(b) by 469 days.

(21) Appl. No.: 10/214,415

(22) Filed: Aug. 6, 2002

(65) Prior Publication Data

US 2003/0065995 A1 Apr. 3, 2003

(30) Foreign Application Priority Data

Aug. 15, 2001 (EP) ............................................. 01306950

(51) Int. Cl.$^7$ ............................................. G01R 31/28
(52) U.S. Cl. ..................................... 714/715; 714/713
(58) Field of Search ........................ 324/765; 375/347, 375/232, 285; 714/715, 713

(56) References Cited

U.S. PATENT DOCUMENTS

| | | | |
|---|---|---|---|
| 3,745,460 A | * 7/1973 | Belzer et al. ............... | 324/765 |
| 5,621,769 A | * 4/1997 | Wan et al. ................... | 375/347 |
| 5,802,105 A | 9/1998 | Tiedemann, Jr. et al. | |
| 6,668,014 B1 | * 12/2003 | Endres et al. .............. | 375/232 |
| 6,792,049 B1 | * 9/2004 | Bao et al. ................... | 375/285 |

FOREIGN PATENT DOCUMENTS

| | | |
|---|---|---|
| WO | 99/65182 | 12/1999 |
| WO | 00/72453 A1 | 11/2000 |

OTHER PUBLICATIONS

"Digital cellular telecommunicatons system (Phase 2+); Test sequences for the Adaptive Multi–Rate (AMR) speech codec," 3GPP TS 06.74 version 7.1.1 Release 1998, pp. 1–14, ETSI TS 101 713 V7.1.1 (Mar., 2001), XP–002187428.

* cited by examiner

*Primary Examiner*—David Ton
(74) *Attorney, Agent, or Firm*—Burr & Brown

(57) ABSTRACT

This invention relates to the measurement of the accuracy of a communication channel. The invention provides a method and apparatus for determining channel degradation information for a communications channel, in which a known data sequence is generated within a transmitter; a coded data sequence based on the known data sequence is transmitted using the transmission channel; said known data sequence is generated within the receiver; and the known data sequence generated within the receiver is compared with a decoded data sequence based on data received via the channel to provide said channel degradation information; wherein a source encoder in the transmitter has the ability to generate a predetermined output data sequence in response to a predetermined input data sequence; the known data sequence is generated within the transmitter and within the receiver in dependence upon the predetermined output data sequence; and the decoded data sequence is measured prior to source decoding in the receiver.

12 Claims, 5 Drawing Sheets

COMMUNICATION CHANNEL ACCURACY MEASUREMENT

FIELD OF THE INVENTION

This invention relates to the measurement of the accuracy of a communication channel.

BACKGROUND OF THE INVENTION

Signals carried over communication channels can undergo considerable transformations, such as digitisation, encryption and modulation. They can also be distorted due to the effects of lossy compression and transmission errors.

Objective processes for the purpose of measuring the quality of a signal are currently under development and are of application in equipment development, equipment testing, and evaluation of system performance.

A number of patents and applications relate to this field, most particularly European Patent 0647375, granted on 14 Oct. 1998. In this invention two initially identical copies of a test signal are used. The first copy is transmitted over the communications system under test. The resulting signal, which may have been degraded, is compared with the reference copy to identify audible errors in the degraded signal. These audible errors are assessed to determine their perceptual significance—that is, errors that are considered significant by human listeners are given greater weight than those that are not considered so significant. In particular inaudible errors are perceptually irrelevant and need not be assessed.

The automated system provides an output comparable to subjective quality measures originally devised for use by human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal. The use of an automated system allows for more consistent assessment than human assessors could achieve, and also allows the use of compressed and simplified test sequences, which give spurious results when used with human assessors because such sequences do not convey intelligible content.

In the patent specification referred to above, an auditory transform of each signal is taken, to emulate the response of the human auditory system (ear and brain) to sound. The degraded signal is then compared with the reference signal in the perceptual domain, in which the subjective quality that would be perceived by a listener using the network is determined from parameters extracted from the transforms.

Such automated systems require a known (reference) signal to be played through a distorting system (the communications network or other system under test) to derive a degraded signal, which is compared with an undistorted version of the reference signal.

Such systems are known as "intrusive" measurement systems, because whilst the test is carried out the system under test cannot, in general, carry live traffic.

Co pending European Patent Application EP 00304497.1 describes a method and apparatus for measuring the performance of a communications channel whilst in use by exploiting periods of spare capacity. The method requires changes to both the transmitter and receiver—the transmitter must be modified in order to identify periods of spare capacity and insert the test signal; the receiver must be modified to extract the received frames prior to a source decoder or prior to a channel decoder, depending upon whether raw error patterns or residual error patterns are required.

SUMMARY OF THE INVENTION

The present invention provides a means of generating both raw and/or residual error patterns from a public land mobile network (PLMN) in a manner such that downlink measurements can be made without the need for modifications to the network infrastructure.

According to the present invention there is provided a method of determining channel degradation information for a communications channel, comprising the steps of generating a known data sequence within a transmitter;

transmitting a coded data sequence based on the known data sequence via said transmission channel;

generating said known data sequence within the receiver; and comparing the known data sequence generated within the receiver with a decoded data sequence based on data received via the channel to provide said channel degradation information;

characterised in that a source encoding substep of the transmitting step has the ability to generate a predetermined output data sequence in response to a predetermined input data sequence;

said known data sequence is generated within the transmitter and within the receiver in dependence upon said predetermined output data sequence; and said decoded data sequence is measured prior to a source decoding step in the receiver.

In a first embodiment of the invention the known data sequence is equal to the predetermined output sequence and in which the decoded data sequence is measured at the input of the source decoder in the receiver.

In a second embodiment of the invention the predetermined output sequence is encoded by a channel encoder to provide the known data sequence and in which the decoded data sequence is measured at the input of a channel decoder in the receiver.

According to another aspect of the invention there is provided a method in which a test signal is degraded using channel degradation information obtained using the first embodiment of the invention, comprising the steps of:

source encoding a test data sequence to produce an encoded data sequence;

modifying the encoded data sequence according to said channel degradation information;

source decoding the modified data sequence to produce a decoded data sequence; and comparing the decoded data sequence to the test data sequence.

According to another aspect of the invention there is provided a method in which a test signal is degraded using channel degradation information obtained using the second embodiment of the invention comprising the steps of:

source encoding a test data sequence and channel encoding the source encoded test data sequence to produce an encoded data sequence;

modifying the encoded data sequence according to said channel degradation information;

channel decoding the modified data sequence and source decoding the channel decoded modified data sequence to produce a decoded data sequence; and comparing the decoded data sequence to the test data sequence.

According to another aspect of the invention there is provided a computer readable medium carrying a computer program for implementing the method described above. A computer program for implementing the method is also provided.

According to further aspects of the invention apparatus for carrying out the methods described above are provided.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
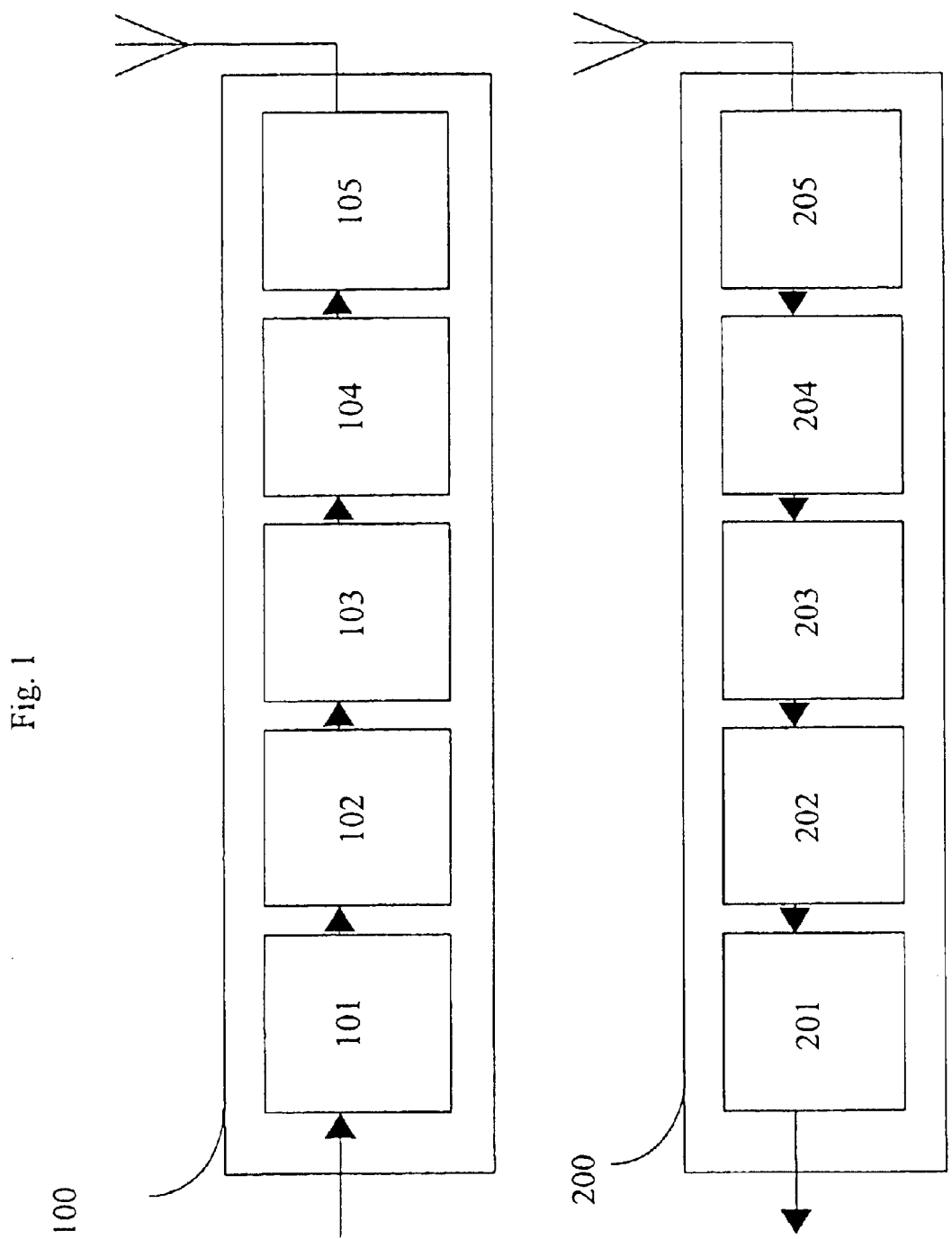
FIG. 1 is a block diagram illustrating a transmitter and a receiver.

Before describing embodiments of the invention, known intrusive measurement systems will be described with reference to FIG. 1 to FIG. 3. FIG. 1 illustrates a known communications system comprising a transmitter 100 and a receiver 200. A source encoder 101 encodes a signal into an encoded data sequence in order to reduce the data rate for a signal to be transmitted using appropriate compression techniques. The data is in the form of a sequence of symbols, which may be binary digits (bits), or may be other encoded symbols.

A channel encoder 102 further encodes the data sequence so that transmission errors can be detected and corrected by the receiver—a process that generally increases the data rate of the encoded sequence. An interleaver 103 reorders the symbols in the data sequence in a manner that improves the performance of the channel encoder 102, together with a channel decoder 202, in the presence of short radio fades (i.e. short bursts of errors). An encryptor 104 encrypts the data sequence to prevent decoding of the data sequence by third parties. Finally, the encrypted data sequence is converted into a radio signal by a modulator 105 and the radio signal is transmitted via a transmission channel to the receiver 200.

The received signal is converted into a data sequence by a demodulator 205, the data sequence is decrypted by the decryptor 204 and reordered by a de-interleaver 203. The channel decoder 202 corrects errors in the de-interleaved data sequence before passing it to a source decoder 201 along with information about errors that have been detected but not corrected. Finally, the source decoder 201 reconstructs a version of the original signal.

The signal at the output of the source decoder 201 will differ from the original signal at the input to the source encoder 101 if the source coding process is lossy or if the channel decoder is unable to detect or correct symbols received in error by the demodulator 205. Demodulation errors are generally caused by a poor signal-to-noise ratio on the radio channel, due to Raleigh fading, signal attenuation, or interference from other radio sources.

The source encoder 101, channel encoder 102, interleaver 103 and encryptor 104 operate independently of each other. Not all of the stages shown in FIG. 1 are included in every communication system.

The present invention applies to communication systems that include a source encoder and decoder (known as a codec) with a homing capability as described hereafter.

The function of the source encoder is to represent a digital input sequence in such a manner that it can be transmitted efficiently over a digital communications channel; the function of the source decoder is to produce a version of the input signal from a received data sequence.

For the purposes of the present invention, the source codec is characterised by the property that, for a given input frame, the resultant output frame depends on both the input frame and the value of encoder stage variables. These variables are carried over from frame to frame, and enable the encoder to use parameters calculated from previous input frames in the calculation of the current output frame. Although the function of most source encoders is to reduce the data rate of the source signal, the use of compression techniques is not essential to the present invention. If the source encoder includes a lossy compression algorithm, the output signal from the source decoder will not be an exact replica of the input signal. An example of a lossy source codec is the GSM enhanced full-rate speech codec.

The channel codec also comprises an encoder and decoder. The function of the encoder is to represent a digital input sequence such that transmission errors can be corrected and detected by the decoder. Algorithms that enable errors to be corrected are called forward error correction (FEC) algorithms. Convolutional FEC schemes are frequently used in digital speech transmission systems. A convolutional code of rate 1/R increases the amount of data to be transmitted by a factor slightly greater than R. Cyclic redundancy codes (CRC) are often used as a means of detecting residual errors that the channel decoder was unable to correct.

Intrusive measurement systems can be readily used to measure the signal degradation caused by a communications system of the type illustrated in FIG. 1, in three conventional arrangements which will now be described with reference to FIG. 2.

In a first arrangement, a reference signal is received by the transmitter 100 and the degraded signal is the corresponding output of the receiver 200. Such a configuration uses the original signal (or a local copy thereof) and the signal passed through the communication system under test to perform the assessment.

In a second arrangement, a test signal is fed into the input of the transmitter 100 in order to generate a data sequence at all points in the transmitter and receiver processing chains. The data sequence at the output of the source encoder 101 and the data sequence at the input of the source decoder 201 are stored. These stored data sequences are compared to form a third data sequence, the residual error pattern, that indicates the position of any errors resulting from the transmission and channel coding processes. When the comparison is performed at the bit level, the residual error pattern is termed the residual bit-error pattern. The residual error pattern may contain information provided by the channel decoder 202 about detected but uncorrected errors, and is stored for use during assessment of a transmission channel.

Figure 2:
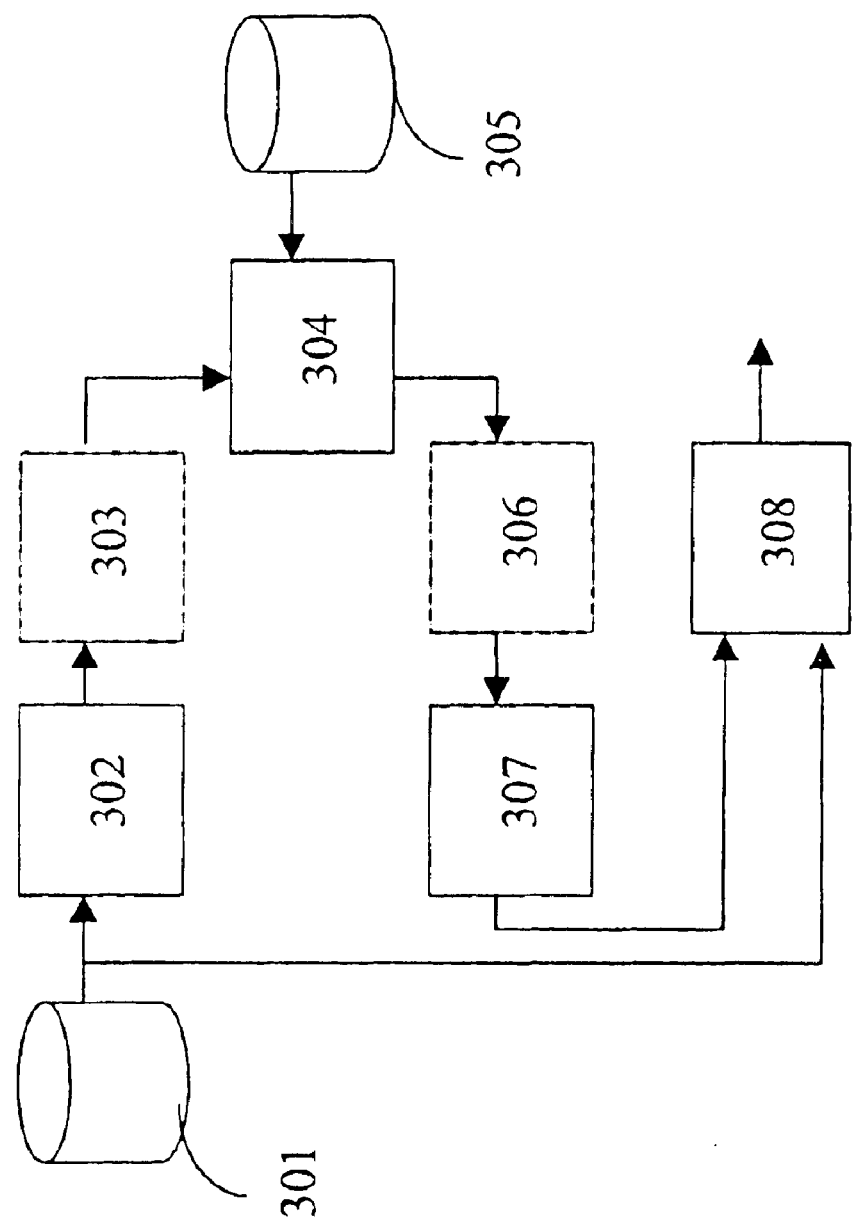
FIG. 2 is a block diagram illustrating apparatus for measuring channel transmission accuracy.

Assessment of transmission channel performance is illustrated in FIG. 2. A test signal 301, which need not be the same as that used to generate the residual error pattern, is passed through a source encoder 302. An error insertion device 304 processes the output of the source encoder such that symbols with sequence positions corresponding to the symbols received in error by the demodulator 205 are modified. Said sequence positions are indicated in the stored residual error pattern 305. The output of the error insertion device 304 is input to a source decoder 307, along with any information about detected but uncorrected errors. Finally, a signal quality assessment algorithm 308, such as but not restricted to that described in European Patent number 0647375, estimates the performance of the channel under test by using the test signal 301 and the output of the source decoder 307 as the reference-degraded signal pair. If the source encoder produces frames comprising multiple bits, it is important that the residual error pattern is aligned with the frame boundaries of the source encoder. This is because the channel codec may apply different levels of error correction to different to symbol positions within a frame to take into account variations in error-sensitivity.

Figure 3:
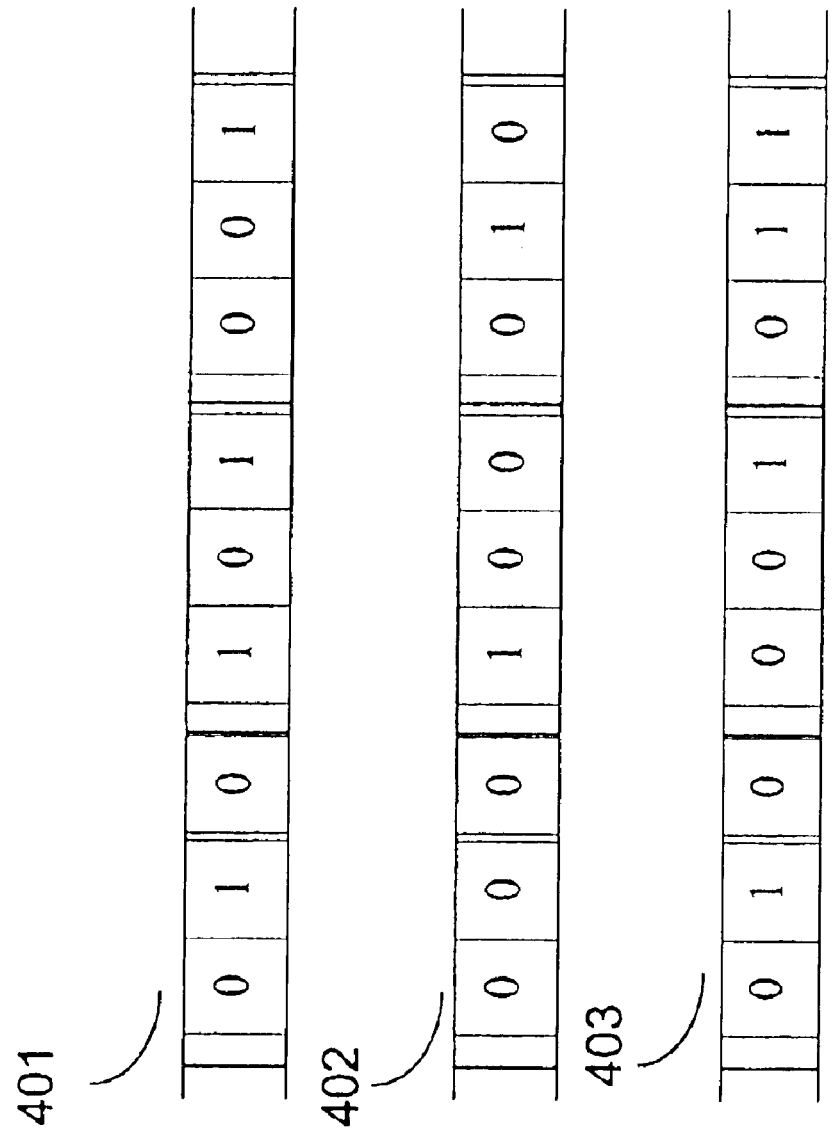
FIG. 3 illustrates generation of a residual error pattern using an error insertion device.

Alignment is illustrated for three frames in FIG. 3, where bit-sequence 401 is the output of the source encoder; bit-sequence 402 is the residual error pattern; and bit-sequence 403 is the output of the error insertion device. A value of '1' in the error pattern indicates that the bit in that position was received in error, and should therefore be inverted. It is possible to use this second arrangement to investigate how different source codecs would perform with the channel codec, modulator, and radio channel used to measure the residual error pattern. This can readily be achieved by changing the source codec in FIG. 2.

In a third arrangement, the bit-stream at the output of the channel encoder 102 is compared to the input of the channel decoder 202 to form a raw bit-error pattern. The demodulator 203 may produce soft-decision values in addition to the value of the received symbol. Soft-decision values indicate the likelihood that a symbol has been received in error, and, when used in combination with a maximum likelihood decoding algorithm such as the Viterbi algorithm, can improve the performance of the channel decoder 203. Soft-decision error patterns are often used in the development of source and channel codecs, and typically include the soft-decision value of the received symbol with an indication of whether the symbol was received correctly or not. Such error patterns are typically produced using software simulations of the radio channel. A reference and degraded signal pair can be generated from the raw error pattern using processing stages similar to those in FIG. 2, but with the addition of a channel encoder 303 and a channel decoder 306. The advantage of this third arrangement is that both the source and channel codec can be changed to investigate how different configurations would perform with the modulator and radio channel used to measure the raw bit-error pattern.

Figure 4:
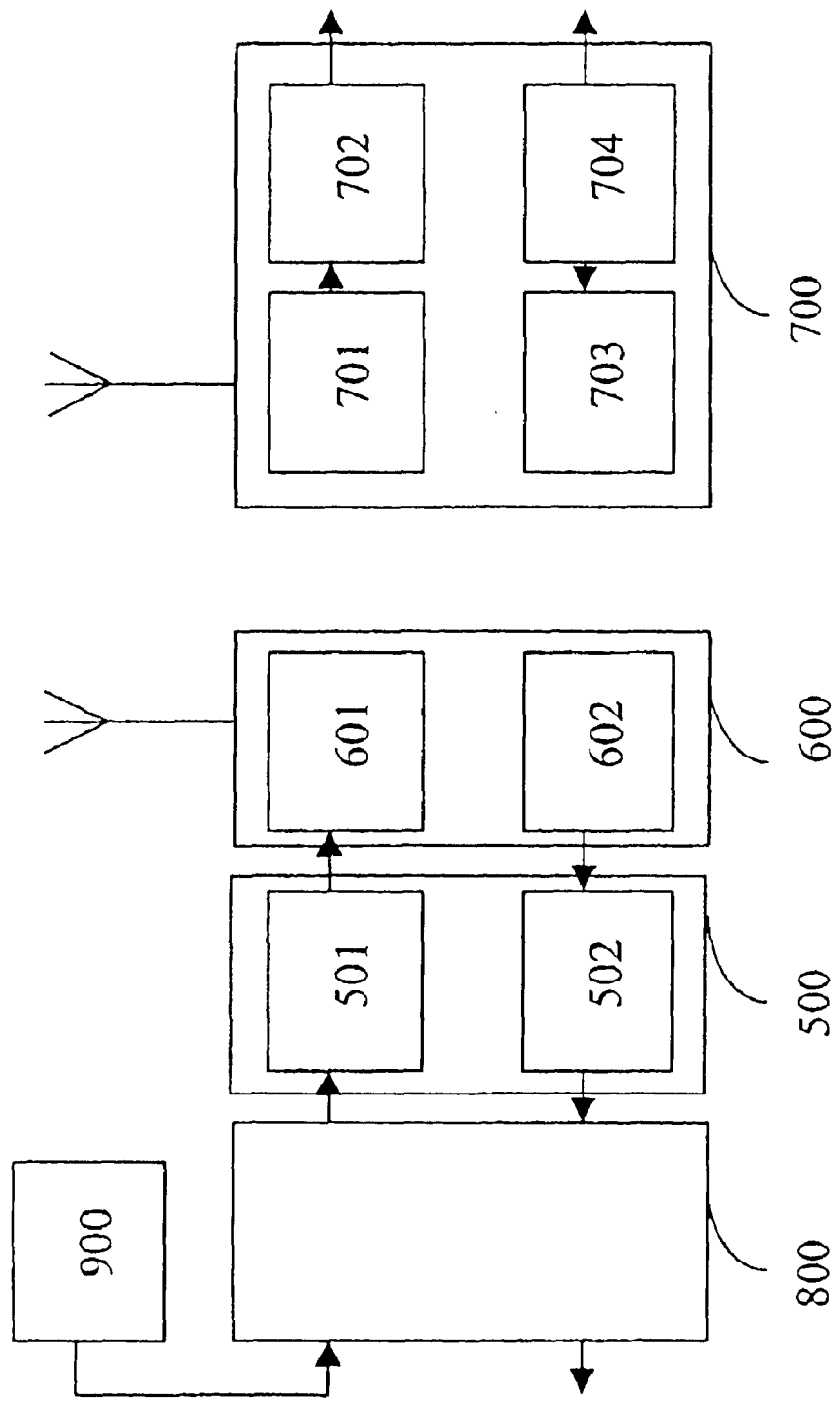
FIG. 4 is a block diagram illustrating the public land mobile radio network (PLMN)

FIG. 4 illustrates an architecture for a typical public land mobile radio network (PLMN). A source codec 501, 502 is located in a mobile switching centre (MSC) 500. A channel codec 601, 602 is located in a base transceiver station (BTS) 600. A mobile station 700 includes both a source codec 702, 704 and channel codec 701, 703. In some networks, a voice quality enhancement (VQE) unit 800 processes the signals before and after the source codec 501, 502.

It is common practice to make intrusive assessments of PLMN performance by injecting a test signal into the network under test via the public switched telephone network (PSTN). The performance of the downlink (network to mobile station direction) can be measured by comparing the original test signal with the corresponding degraded signal received at the mobile station using an appropriate signal quality assessment algorithm. This corresponds to the first arrangement described above and has the advantage that no changes to the network infrastructure are required in order to make the necessary measurements. However, this method can only assess the performance of the speech and channel codecs implemented in the network under test.

Codec homing was developed to address a specific problem concerned with using digital test vectors to verify source codec implementations. Codec homing is included in a number of common source coding standards, including the global system for mobile communications (GSM) half-rate (HR), enhanced full-rate (EFR), and adaptive multi-rate (EFR) speech services. Digital test vectors are designed to test if the operation of an implementation under test is identical to that of a reference implementation. Typically, each test vector comprises an input sequence and an output sequence, the latter being generated from the former by a reference implementation. The input sequence is fed to the implementation under test and the resulting output compared to the reference output sequence. If the test and reference output sequences are identical for all test vectors, the operation of the implementation is said to be 'bit-exact' with that of the reference.

If the reference and test implementations are to provide identical outputs from the same input sequence, the internal state or memory of the two algorithms at the start of the sequence must be identical. For this reason, the first few frames of an input test vector contain a homing sequence that resets the codec to a known internal state.

There are usually two types of homing frames, one for the encoder and one for the decoder, and the response to an input homing frame is typically a homing frame of the other type—that is, an encoder will generate a decoder homing sequence upon receiving an encoder homing sequence; a decoder will generate an encoder homing sequence upon receiving a decoder homing sequence. This procedure enables encoders and decoders in a chain to be reset remotely. In particular, it allows the source encoder and decoder in a mobile station to be tested via a radio channel, although this must be done in a controlled environment where there are no radio errors.

It can be seen that codec homing was developed for the specific purpose of verifying the bit-exact operation of codec implementations by means of digital test sequences. Moreover, when used in conjunction with a radio channel, that radio channel must necessarily be error-free, otherwise it would not be possible to determine whether differences between the test and reference outputs were due to implementation errors or radio transmission errors.

The present invention applies to the performance evaluation of transmission channels that include a source codec with codec homing functionality. The present invention exploits the codec homing capability to test the performance of a transmission channel. This is achieved by receiving a sequence of codec homing frames at the input of the source encoder to generate a known sequence at its output. Error patterns are then constructed by comparing the digital sequences received at various points in the transmission channel with the output of an error-free reference system at the same points.

The invention is particularly useful when measuring the downlink performance of a PLMN, because the homing sequence for the downlink source encoder can be sent to the PLMN from a remote location by means of an integrated subscriber digital network (ISDN) call, for example. Thus, error patterns can be constructed without requiring access to or modification of the PLMN infrastructure. Remote injection of a known test signal would not normally be possible, because the internal state of the source encoder would be unknown thus precluding the generation of a predetermined output.

The sequences required for generation of the error patterns can be extracted in a mobile station modified for the purpose.

Figure 5:
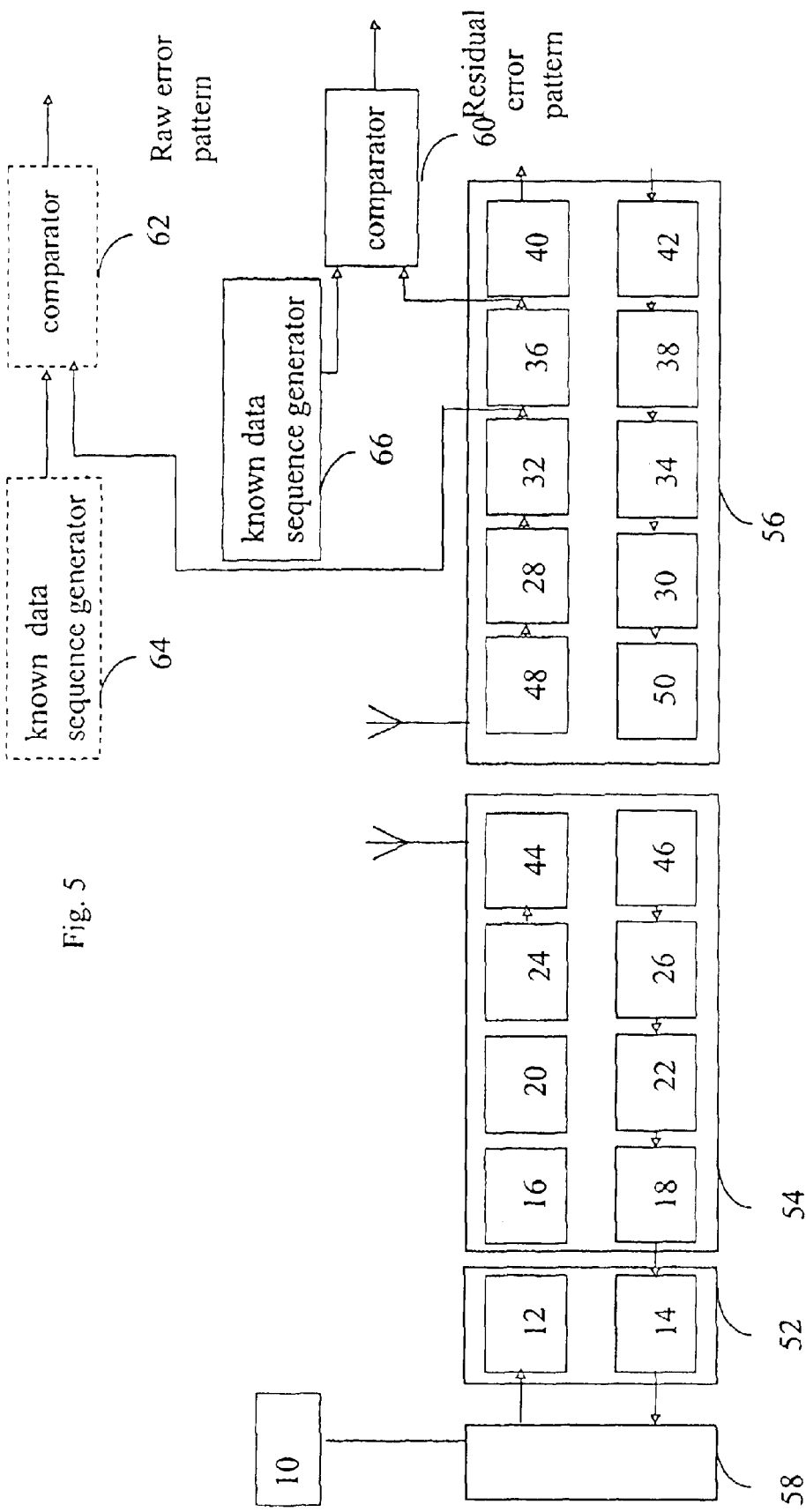
FIG. 5 is a block diagram illustrating a PLMN for illustration of one embodiment of the present invention.

Three embodiments of the present invention will now be described with reference to FIG. 5 which represents a PLMN conforming to the GSM specification.

In all of the embodiments, an ISDN call is made to the PLMN under test via the PSTN. ISDN is used because it provides a transparent digital connection between a test signal generator 10 and the input to a VQE unit 58.

In certain cases, the VQE unit may corrupt the digital test signal, however, there are a number of solutions to this problem:
 a) the test signal can be pre-encoded such that the output of the VQE unit is the desired signal;
 b) the VQE unit is disabled by means of in-band signals such as tones;
 c) the VQE unit is disabled by external signalling such as ITU-T Q.931.

In the embodiments described, a source codec (12, 14) comprising a GSM encoder 12 and a GSM decoder 14 is used in a MSC 52. In the case of the GSM source codecs, the encoder homing sequence corresponds to a frame of values equal to +1 in the 13-bit pulse code modulation (PCM) domain. This sequence corresponds to ITU-T G.711 A-law idle code, and temporarily disables the processing performed by some VQE units.

In the first embodiment, the test signal generator 10 produces a data sequence such that a continuous stream of values equal to +1 in the 13-bit domain, constituting the predetermined input data sequence of the present invention, are sent to the source encoder 12 via the VQE unit 58. This causes the GSM source encoder 12 to repeatedly generate decoder homing frames, constituting the predetermined output data sequence of the present invention, at its output. In the first embodiment of the invention this predetermined output data sequence also constitutes the known data sequence. The known data sequence is channel encoded by a channel encoder 16, interleaved by an interleaver 20 and encrypted by an encryptor 24 before being sent to a modulator 44 for transmission. The channel encoder 16, interleaver 20 encryptor 24 and modulator 44 are all part of a BTS 54.

The signal received by a mobile station 56, which is demodulated by a demodulator 48, decrypted by a decryptor 28, deinterleaved by a deinterleaver 32, and channel decoded by a channel decoder 36. The data stream at the output of the channel decoder 36 is stored, and constitutes the decoded data sequence in this embodiment of the invention.

The known data sequence is generated at the mobile station 56 by a known data sequence generator 66. The known data sequence may be generated using a source encoder 42, from the predetermined input data sequence described above. Alternatively, a pre-stored copy of the known data sequence can be used. The decoded data sequence is compared to the known data sequence using a comparator 60 to yield a residual bit-error pattern.

Comparison of the decoded data sequence by the comparator 60 and known data sequence may require a frame alignment step. This is readily implemented by choosing the phase offset that minimizes the number of residual errors over a number of frames.

The performance of the complete transmission channel is then evaluated using the residual bit-error pattern in the second arrangement of signal quality assessment described above with reference to FIG. 2. As explained earlier, residual error-patterns enable evaluation of different source codecs with the channel under test, including but not limited to the source codecs deployed in the PLMN channel tested.

As mentioned above, the residual error pattern may include information regarding uncorrected but detected errors. In the GSM system described, this information is the result of a cyclic redundancy check (CRC) calculated over the subjectively most important bits of each frame. The result of the CRC for each frame is stored in the residual error pattern and passed to the source decoder 301, which uses it for error concealment purposes.

In the second embodiment the data stream at the input to the channel decoder 36 is stored and constitutes the decoded data sequence of the present invention.

In this second embodiment the known data sequence is generated at the mobile station 56 using a known data sequence generator 64. The known data sequence may be generated from the predetermined input data sequence using the source encoder 42 and a channel encoder 38, so it is not the same as the known data sequence at the input to the comparator 60. Alternatively, a pre-stored copy of the required known data sequence can be used. Comparison of the decoded data sequence with the known data sequence from the known data sequence generator 64 at a comparator 62 yields a raw bit-error pattern.

The performance of the communications channel is then evaluated using the raw bit-error pattern in the third arrangement of signal quality assessment described above with reference to FIG. 2. The raw error pattern may include soft decisions values, although this is not essential to the invention. As explained earlier, raw bit-error patterns enable evaluation of different source and channel codecs with the channel under test, including but not limited to the source and channel codecs deployed in the PLMN channel tested.

In the above description reference is not made to a demodulator 46, decrypted by a decryptor 26, a deinterleaver 22, a channel decoder 18 in the BTS 54, or to an interleaver 34 encryptor 30 and modulator 50 in the mobile station. However, these functional blocks have been included in the diagram for completeness.

A limitation of the first and second embodiments is that the predetermined output data sequence generated at the output of the source encoder 501 repeats every frame. In a system employing encryption, such as GSM, the encryption will ensure that the data transmitted over the radio channel does not repeat. In the first embodiment, however, the data received by the channel decoder 36 will repeat every frame (ignoring transmission errors).

In a third embodiment, it is arranged that the predetermined input data at the input to the source encoder 12 comprises the homing sequence of the source encoder followed by a second known data sequence such that the predetermined output data at the output of the source encoder does not repeat every frame.

In this third embodiment, the alignment of the input sequence with the internal frames of the source encoder may affect the output of the source encoder. Methods of determining the phase alignment of a source codec are known to the art. For example, a method for determining the internal frame alignment of a source codec is described in the GSM specifications for the purposes of aligning test vectors (the procedure for the enhanced full rate GSM speech codec is described in GSM 06.54). Such alignment procedures could also be used for source encoders that require the homing sequence to be specifically aligned with the source encoder frame.

It will be understood by those skilled in the art that the methods described above may be implemented on a conventional programmable computer, and that a computer program encoding instructions for controlling the programmable computer to perform the above methods may be provided on a computer readable medium.

What is claimed is:

1. A method of determining channel degradation information for a communications channel, comprising the steps of
    generating a known data sequence within a transmitter;
    transmitting a coded data sequence based on the known data sequence via said transmission channel;
    generating said known data sequence within the receiver; and
    comparing the known data sequence generated within the receiver with a decoded data sequence based on data received via the channel to provide said channel degradation information;
    characterised in that
    a source encoding substep of the transmitting step has the ability to generate a predetermined output data sequence in response to a predetermined input data sequence;
    said known data sequence is generated within the transmitter and within the receiver in dependence upon said predetermined output data sequence; and
    said decoded data sequence is measured prior to a source decoding step in the receiver.

2. A method according to claim 1 in which the known data sequence is equal to the predetermined output sequence and in which the decoded data sequence is measured at the input of the source decoder in the receiver.

3. A method in which a test signal is degraded using channel degradation information obtained according to claim 2, comprising the steps of:
    source encoding a test data sequence to produce an encoded data sequence;
    modifying the encoded data sequence according to said channel degradation information;
    source decoding the modified data sequence to produce a decoded data sequence; and
    comparing the decoded data sequence to the test data sequence.

4. A method according to claim 1 in which the predetermined output sequence is encoded by a channel encoder to provide the known data sequence and in which the decoded data sequence is measured at the input of a channel decoder in the receiver.

5. A method in which a test signal is degraded using channel degradation information obtained according to claim 4, comprising the steps of:
    source encoding a test data sequence and channel encoding the source encoded test data sequence to produce an encoded data sequence;
    modifying the encoded data sequence according to said channel degradation information;
    channel decoding the modified data sequence and source decoding the channel decoded modified data sequence to produce a decoded data sequence; and
    comparing the decoded data sequence to the test data sequence.

6. A computer readable medium carrying a computer program for implementing the method according to claim 1.

7. An apparatus for determining channel degradation information for a communication channel comprising
    a transmitter (52,54) comprising
        means (12) for generating a known data sequence;
        means (54) for transmitting, via the communication channel, a coded data sequence based on the known data sequence; and
    a receiver (56) comprising
        a decoder (48, 28, 32, 36, 40), having a source decoder (48), arranged to decode a received coded data sequence and arranged to generate a decoded data sequence;
        means (66) for generating a local copy of said known data sequence;
        a comparator (60,62) arranged to compare the decoded data sequence with the local copy of said known data sequence to generate said channel degradation information;
    characterised in that
    the means for generating a known data sequence in the transmitter (52) comprises a source encoder (12) in which a predetermined output data sequence is generated in dependence upon a predetermined input data sequence, and is arranged to generate the known data sequence in dependence upon the predetermined output data sequence;
    the means (64,66) for generating a local copy of the known data sequence is arranged to generate the known data sequence in dependence upon the predetermined output data sequence; and
    the decoder (48, 28, 32, 36, 40) is arranged to generate the decoded data sequence in the receiver prior to decoding by the source decoder (40).

8. An apparatus according to claim 7, in which
    the means (12) for generating the known data sequence, and the means (66) for generating a local copy of the known are arranged to generate a known data sequence which is equal to the predetermined output data sequence; and
    the decoder (56) is arranged to generate the decoded data sequence in the receiver at the input of the source decoder.

9. An apparatus according to claim 6 further comprising
    a source encoder (302) arranged to encode a test data sequence (301) to produce an encoded data sequence;
    an error insertion device (305) arranged to modify the encoded data sequence according to said channel degradation information;
    a source decoder (307) arranged to decode the modified data sequence to produce a decoded data sequence; and
    a comparator (308) arranged to compare the decoded data sequence and the test data sequence.

10. An apparatus according to claim 7, in which
    the means (12,16) for generating the known data sequence in the transmitter, and the means (64) for generating a local copy of the known data sequence in are arranged to generate a known data sequence which is equal to channel encoding of the predetermined output data sequence; and
    the decoder (56) in the receiver further comprises a channel decoder (36) arranged to send a signal to the source decoder, the decoder being arranged to generate the decoded data sequence in the receiver at the input of a channel decoder.

11. An apparatus according to claim 10 further comprising a source encoder (302) and a channel encoder (303) arranged to encode a test data sequence (301) to produce an encoded data sequence;

an error insertion device (305) arranged to modify the encoded data sequence according to said channel degradation information;

a channel decoder (306) and a source decoder (307) arranged to decode the modified data sequence to produce a decoded data sequence; and a comparator (308) arranged to compare the decoded data sequence and the test data sequence.

12. A computer program for implementing the method according to claim 1.

* * * * *